United States Patent [19]
Selzer

[11] 3,978,740
[45] Sept. 7, 1976

[54] ADJUSTABLE STEERING COLUMN

[75] Inventor: Robert J. Selzer, Fort Wayne, Ind.

[73] Assignee: International Harvester Company, Chicago, Ill.

[22] Filed: June 2, 1975

[21] Appl. No.: 583,351

[52] U.S. Cl. .................................. 74/493; 74/527; 248/299
[51] Int. Cl.² .......................................... B62D 1/18
[58] Field of Search .............. 74/493, 527; 248/299; 403/82

[56] References Cited
UNITED STATES PATENTS

| | | | |
|---|---|---|---|
| 1,367,695 | 2/1921 | Gray | 74/493 |
| 2,075,110 | 3/1937 | Garretson | 74/493 |
| 2,140,319 | 12/1938 | Heppner et al. | 74/493 |
| 2,185,779 | 1/1940 | Tveidt | 74/493 |
| 2,464,856 | 3/1949 | Finley | 74/493 |
| 2,937,839 | 5/1960 | Randolph | 248/299 X |
| 3,504,569 | 4/1970 | Zoltok | 74/493 |
| 3,533,302 | 10/1970 | Hansen | 74/493 |
| 3,724,290 | 4/1973 | Burton | 74/493 |
| 3,786,691 | 1/1974 | Lindstrom | 74/493 |

Primary Examiner—Allan D. Herrmann
Attorney, Agent, or Firm—John P. O'Brien; Floyd B. Harman

[57] ABSTRACT

An adjustable steering wheel assembly for a motor vehicle comprises an elongated guide member secured to the motor vehicle body having an arcuate shaped longitudinal axis that intersects with the axis of the steering shaft, and an elongated side member secured to the steering wheel shaft support having an arcuate shaped longitudinal axis conforming to the longitudinal axis of the guide member for providing a sliding engagement therebetween. A releasable lock means is provided for selectively holding the slide member in one of a plurality of pre-set positions along the guide member.

10 Claims, 5 Drawing Figures

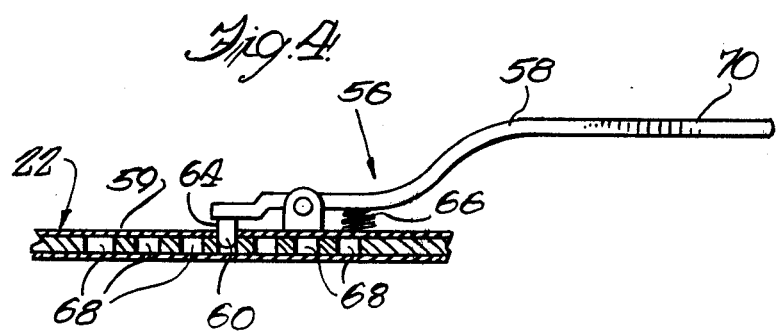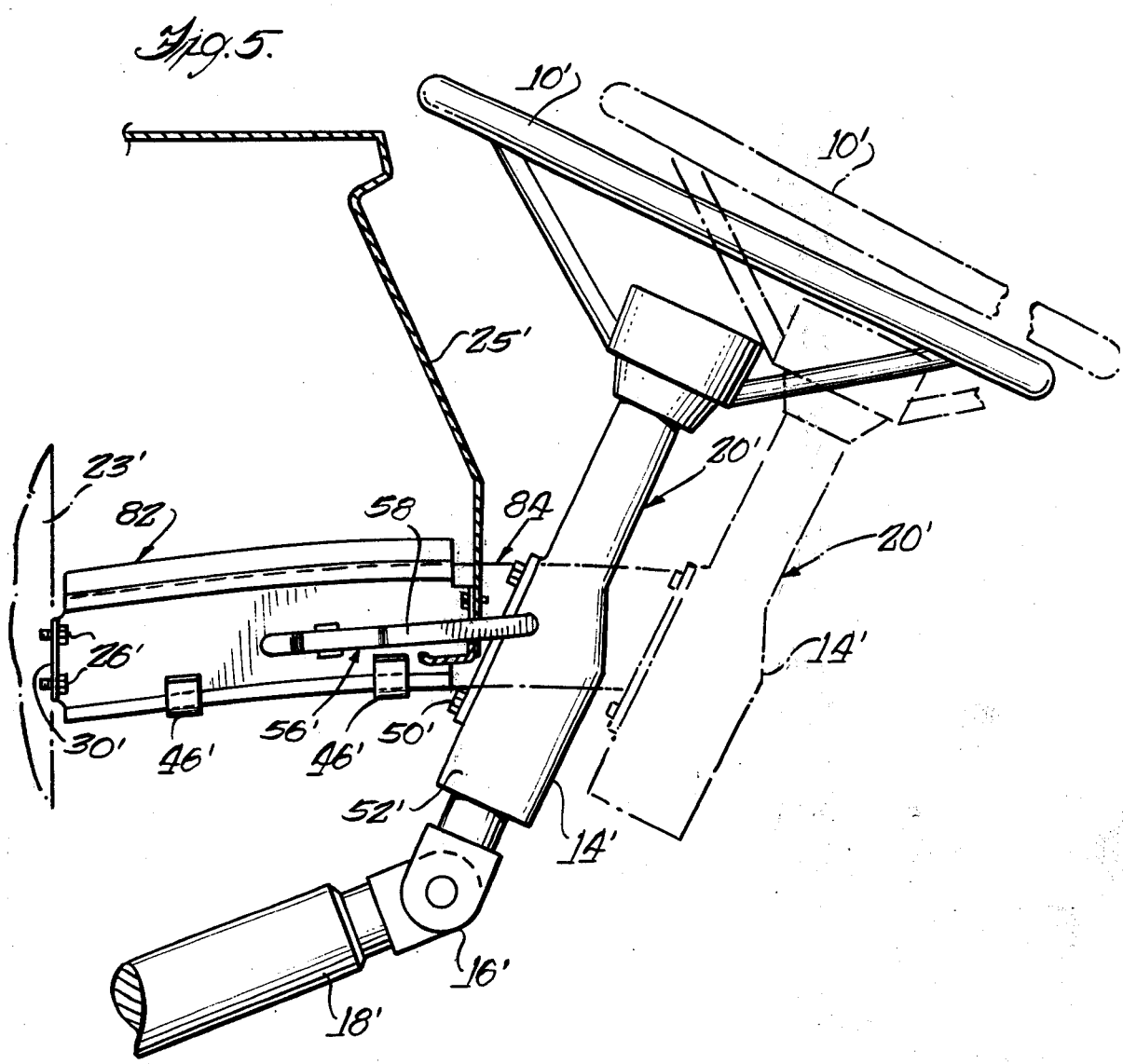

ADJUSTABLE STEERING COLUMN

BACKGROUND OF THE INVENTION

This invention relates to an adjustable steering assembly, and in particular to an adjustable steering assembly permitting movement of the steering shaft and associated steering wheel in an up and down direction and a forward and rearward direction.

In the prior art, there are many known mechanisms for permitting the steering column to be selectively adjusted in the up and down direcion, such as disclosed by U.S. Pat. No. 3,803,939 to James L. Schenten, and to be selectively adjusted in the forward and rearward directions, such as disclosed by U.S. Pat. No. 3,678,778 to Donald W. Groves. In some prior art structures, both of these types of adjustment are provided for, such as U.S. Pat. No. 3,412,629 to W. B. Hill.

The disadvantage of those prior art structures that provide both types of adjustment, such as disclosed in the Hill patent, is that they require the use of two separate and independent mechanisms that must be individually set to provide the two types of adjustment. The fact that these prior art structures use two independent mechanisms causes the jointed angles of the steering column to get out of cancellation because they are not positively controlled. To avoid such a cancellation, these prior art structures must use a constant velocity joint, which is a relatively expensive part.

The object of this invention is to avoid the above noted disadvantages of the adjustable steering column structure by providing an integrated mechanism that provides adjustment of the fore and aft location and the angle position of the steering wheel with a single operating step.

SUMMARY OF THE INVENTION

This invention relates to an improvement in a steering wheel assembly for a motor vehicle to permit the adjustment of the steering wheel for both location and angle by a single adjustment. My invention uses an elongated curved guide member secured to the body of the motor vehicle and extending transversely towards the steering wheel shaft support member in which the curved guide member has a longitudinally extending curved guideway for slidably receiving a conforming curved slide member which is secured at its forward end to the steering wheel shaft support member for repositioning the shaft support member and associated steering wheel. A lock means is also provided for selectively holding the slide member in one of a plurality of pre-selected fixed positions along said guide member.

DESCRIPTION OF THE DRAWINGS

For a better understanding of this invention reference may be made to the accompanying drawings in which:

FIG. 4 is a partial sectional view taken along the lines 4—4 of FIG. 1 and looking in the direction of the arrow; and FIG. 5. is a side elevational view of an adjustable steering column and associated adjustable steering assembly incorporating a modified version of the preferred embodiment of this invention.

DESCRIPTION OF THE PREFERRED EMBODIMENT

Figure 1:
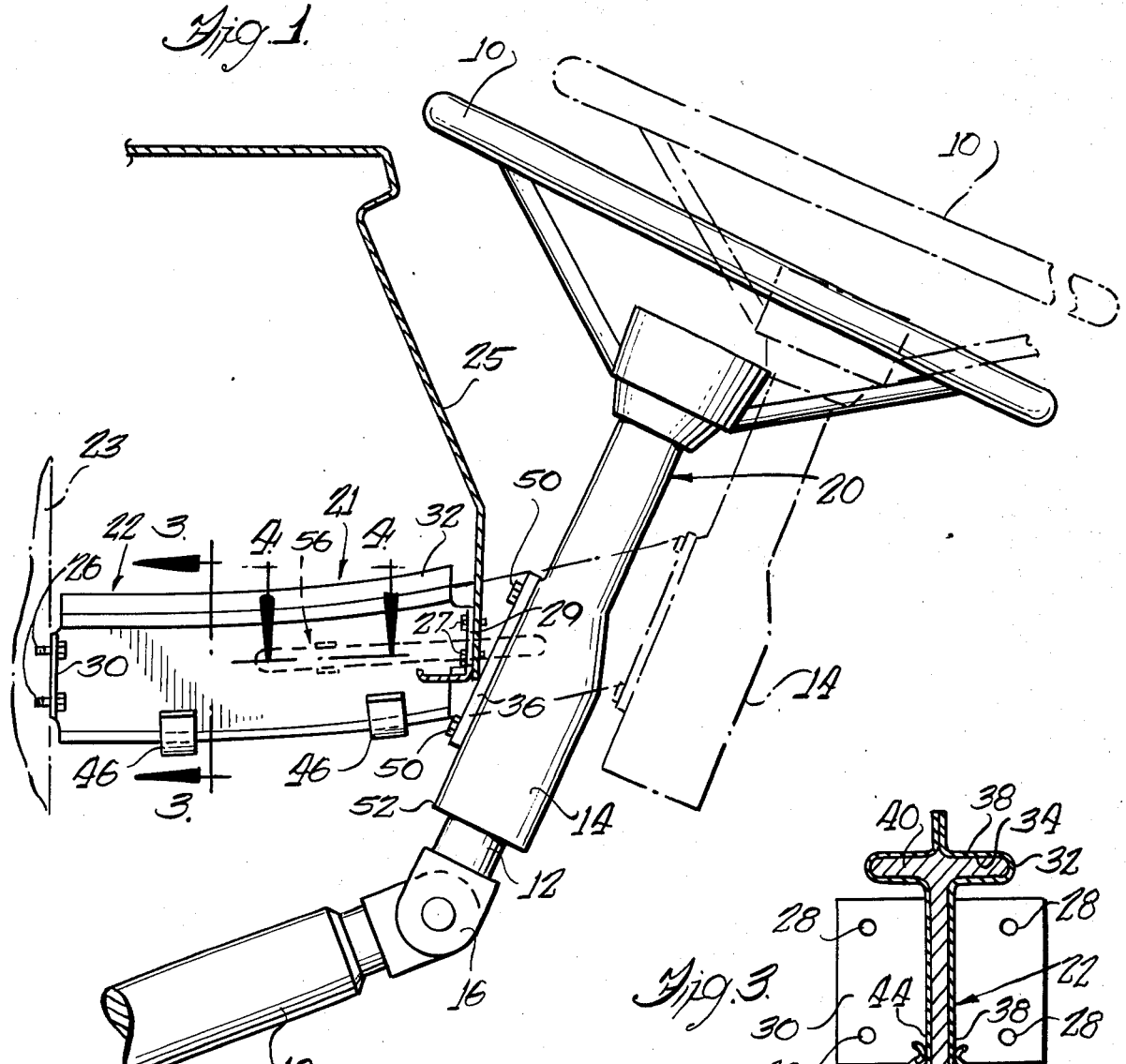
FIG. 1 is a side elevational view showing a portion of the adjustable steering column and adjustable steering assembly constructed in accordance with the principles of this invention.

Referring now to the drawings, FIG. 1 discloses a vehicle steering wheel 10 affixed to the top of steering shaft 12 which, in turn, is rotatably supported by column shaft support member 14. A universal joint 16 serves as a connection between the shaft 12 and a steering shaft member 18 which is connected at the other end (not shown) to the vehicle's steering linkage in a conventional manner.

To permit the entire steering column 20 to be adjustably positioned in both the forward and aft location and the up and down angle orientation there is provided an adjustable steering wheel assembly 21 embodying the principles of my invention. The steering wheel assembly 21 is constructed of an elongated guide member 22 secured at one end to the body 23 of the motor vehicle and extending transversely towards the shaft support member 14, and an elongated slide member 24 is slidably supported by guide member 22 for selected displacement of the steering column 20.

The elongated guide member 22 is attached to the vehicle body 24 at its forward end by means of screws or the like 26 which are mounted through the four spaced mounting holes 28 formed in the end flange 30 and is attached to dashboard 25 by means of screws 27 mounted through openings in outwardly extending flange 29. Extending in a normal relation to the end flange 30 is elongated guide member 32 having a T-shaped curved channel 34 of uniform cross section along its entire length. The guide way 32 has an arcuate shape which extends along its longitudinal axis in an upward direction from the end flange 30.

The elongated slide member 24 is integrally constructed of an end flange 36 and a rigid one-piece member 38 having a T-shaped curved upper portion 40 of uniform cross section and dimensioned slightly less than the T-shaped curved channel 34 of guide member 22 for slidable movement therein. A foot portion 42 is integrally formed with the one-piece member 38 and extends downwardly from the opened end of T-shaped channel 34. To maintain the lower open end 44 of the T-channel 34 in slidable contact with the one-piece member 38 a plurality of spring clips 46 are clamped at spaced intervals across its open end.

The end flange 36 of elongated slide member 24 has mounting holes 48 provided at its four corners through which are inserted four bolts 50 that are screwed into aligned threaded apertures in the back surface 52 of column shaft support member 14.

By virtue of this arrangement, the vehicle operator may selectively reposition the steering wheel 10 by exerting either an outward or inward force relative to the front of the vehicle to cause the slide member 24 to move along the guideway 32 of guide member 22. Because the guide member 22 and slide member 24 have conforming upward curved configurations such a displacement will reposition the steering wheel in both the fore and aft directions and the up and down directions. This simultaneous two directional movement is clearly depicted in FIG. 1 by the position of the column shaft support member 14 shown in phantom lines and solid lines.

Figure 2:
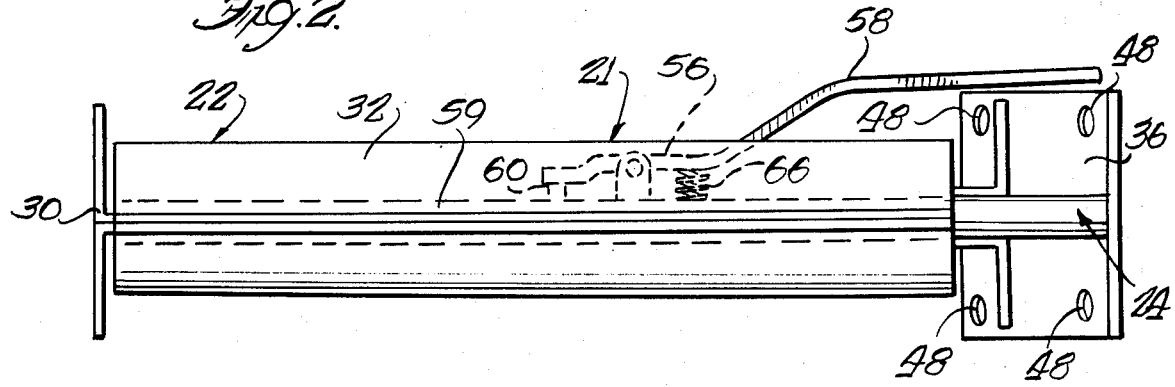
FIG. 2 is a top elevational view of the adjustable steering assembly constructed in accordance with the principles of this invention.

Once the operator has positioned the steering wheel in a desired position a lock means 56 is provided to hold the slide member 24 in this desired position relative to the guide member 22. Referring to FIGS. 2 and 4, the lock means 56 comprises a lever 58 pivotally mounted on the outside surface of the central body portion 59 of elongated guide member 22 having an indexing pin 60 secured to the shorter end of lever 58 in alignment with an aperture 64. A compression spring 66 is provided on the other side of the lever 58 to provide a constant bias force urging the pin 62 to project into the guideway 32. The T-shaped curved upper portion 40 of slide member 24 is provided with a series of indexing slots 68 that are in alignment with the aperture 64 for receiving the pin 62 therethrough to provide a locked engagement with the slide member 24.

In operation of the preferred embodiment the operator depresses the handle portion 70 of lever 58 to free the slide member 24 from its locked position thereby freeing the slide member 24 for movement. The operator then repositions the steering wheel 10 to the desired position and releases the handle 70 to allow the spring 66 to force the pin 62 into the closest aperture in slide member 22 to once again lock the steering wheel in a fixed position.

SECOND EMBODIMENT

Figure 3:
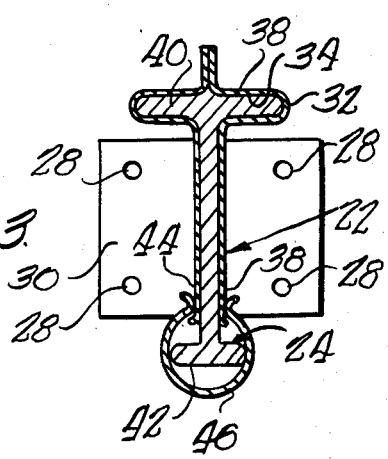
FIG. 3 is a sectional view taken along the lines 3—3 of FIG. 1 and looking in the direction of the arrows.

Referring to FIG. 5 there is shown a second embodiment of this invention in which like parts are designated by the prime member. The only significant between the FIG. 5 embodiment and the embodiment shown in FIGS. 1 through 3 is that the guide member 82 and slide member 84 are curved downwardly such that the steering wheel 10' as it is pulled outwardly will be simultaneously lowered rather than raised as shown in FIG. 1.

It will be appreciated that the arcuate angle of guide member 82 and slide member 84 and the choice of whether the member bends upwardly or downwardly will be determined by the particular application of the steering wheel assembly to a particular motor vehicle interior.

I claim:

1. An improvement in a steering wheel assembly for a motor vehicle having an upper steering shaft with a steering wheel affixed on the upper end thereof and a shaft support member rotatably supporting said upper steering shaft, said improvement comprising an elongated guide member secured to the body of said motor vehicle and extending transversely towards said shaft support member, said elongated guide member having longitudinally extending arcuate guideway, an elongated slide member secured to said shaft support member and slidably engaged with said guide member, said slide member having longitudinally extending follower portion of the same arcuate configuration as said arcuate guideway, said follower portion being disposed in a slidable interfitting relation with said guideways of said guide member, said arcuate guideway having a curvature shaped to cause the simultaneous two directional movement of said steering wheel in the fore and aft direction and in the up and down direction in response to any displacement of said slide member along said guide member, and lock means for selectively holding said slide member in one of a plurality of pre-set fixed positions along said guide member.

2. The improvement as defined in claim 1 wherein the conforming curved configuration of said guide member and said slide member is a downwardly extending arc in the direction away from said shaft support member.

3. The improvement as defined in claim 1, wherein said conforming curved configuration of said guide member and said slide member is an upwardly extending arc in the direction away from said shaft support member.

4. The improvement as defined in claim 1, wherein said guide member includes a T-shaped curved channel of uniform cross section extending along its length to define said curved guideway and said slide member includes a rigid one-piece member having a T-shaped curved upper portion of uniform cross section extending into said T-shaped curved channel in a slidable interfitting relation to define said follower portion.

5. The improvement as defined in claim 4, wherein said lock means comprises a lever pivotally mounted along its length on one of the outside surfaces of said guide member, a pin projecting from one end of said lever towards said one outside surface, an opening formed through said guide member into communication with said T-shaped channel and in alignment with said pin for permitting said pin to pass therethrough into said channel, and a plurality of closely spaced apertures formed longitudinally in said T-shaped portion of said slide member in alignment with said opening in said guide member for receiving said pin.

6. An improvement in a steering wheel assembly for a motor vehicle having an upper steering shaft with a steering wheel affixed on the upper end thereof and a shaft support member rotatably supporting said upper steering shaft, said improvement comprising an elongated guide member having an arcuate-shaped longitudinal axis secured to the body of said vehicle and extending transversely towards said shaft support member, an elongated slide member having an arcuate-shaped longitudinal axis identical to the longitudinal axis of said guide member secured to said shaft support member in sliding engagement with said guide member, the curvature of said elongated guide member being shaped to cause the simultaneous two directional movement of said steering wheel in the fore and aft direction and in the up and down direction in response to any displacement of said slide member along said guide members, and releasable lock means for selectively holding said slide member in one of a plurality of pre-set positions along said guide member.

7. The improvement as defined in claim 6, wherein said elongated guide member comprises a central body portion having a T-shaped channel of uniform cross section extending along its arcuate-shaped length and an end flange portion formed at the opposite ends of said central body portion for fastening to interior walls of said vehicle body, and wherein said slide member comprises a rigid one-piece member having a T-shaped upper portion of uniform cross section along its arcuate-shaped length extending into said T-shaped channel in a slidable interfitting relation.

8. The improvement as defined in claim 6, wherein the arcuate-shaped longitudinal axis of said guide member and said slide member curves downwardly in the direction away from said shaft support member.

9. The improvement as defined in claim 6, wherein the arcuate-shaped longitudinal axis of said guide member and said slide member curves upwardly in the direction away from said shaft support member.

10. The improvement as defined in claim 7, wherein said lock means comprises a lever pivotally mounted along its length on one of the outside surfaces of said central body portion of said guide member, a pin projecting from one end of said lever towards said one outside surface, an opening formed through said central body portion into communication with said T-shaped channel and in alignment with said pin for permitting said pin to pass therethrough into said channel, and a plurality of closely spaced apertures formed longitudinally in said T-shaped upper portion in alignment with said opening in said guide member for receiving said pin.

* * * * *